May 29, 1923.

H. E. WILDER 1,456,662

TOURIST MAP AND OPERATING MECHANISM THEREFOR

Filed Aug. 1, 1922     3 Sheets-Sheet 3

Witnesses:
F. L. Fox,
H. Berman

Inventor
Harry E. Wilder,
By Clarence A. O'Brien
Attorney

Patented May 29, 1923.

1,456,662

UNITED STATES PATENT OFFICE.

HARRY E. WILDER, OF EL PASO, TEXAS.

TOURIST MAP AND OPERATING MECHANISM THEREFOR.

Application filed August 1, 1922. Serial No. 578,892.

*To all whom it may concern:*

Be it known that I, HARRY E. WILDER, a citizen of the United States, residing at El Paso, in the county of El Paso and State of Texas, have invented new and useful Improvements in Tourist Maps and Operating Mechanism Therefor, of which the following is a specification.

In carrying out the present invention it is my purpose to provide a tourist map and operating mechanism therefor which may be attached to a motor vehicle and operated from the vehicle in the travel thereof in proportion to the distance covered by the vehicle, so that the operator of the vehicle will be at all times advised as to the topography of the country through which he is travelling and the location of supply stations, etc. along the road.

It is also my purpose to provide an operating mechanism for a tourist map which will embrace the desired features of simplicity, efficiency and durability, which may be manufactured and marketed at small cost and which may be quickly and easily installed in a motor vehicle.

With the above recited objects in view, and others of a like nature, the invention resides in the construction, combination and arrangement of parts set forth in and falling within the scope of the appended claim.

In the accompanying drawings:

Figure 5 is a sectional view on the line 5—5 of Figure 2.

Figure 6 is a view of a detail of the invention.

Figure 1:
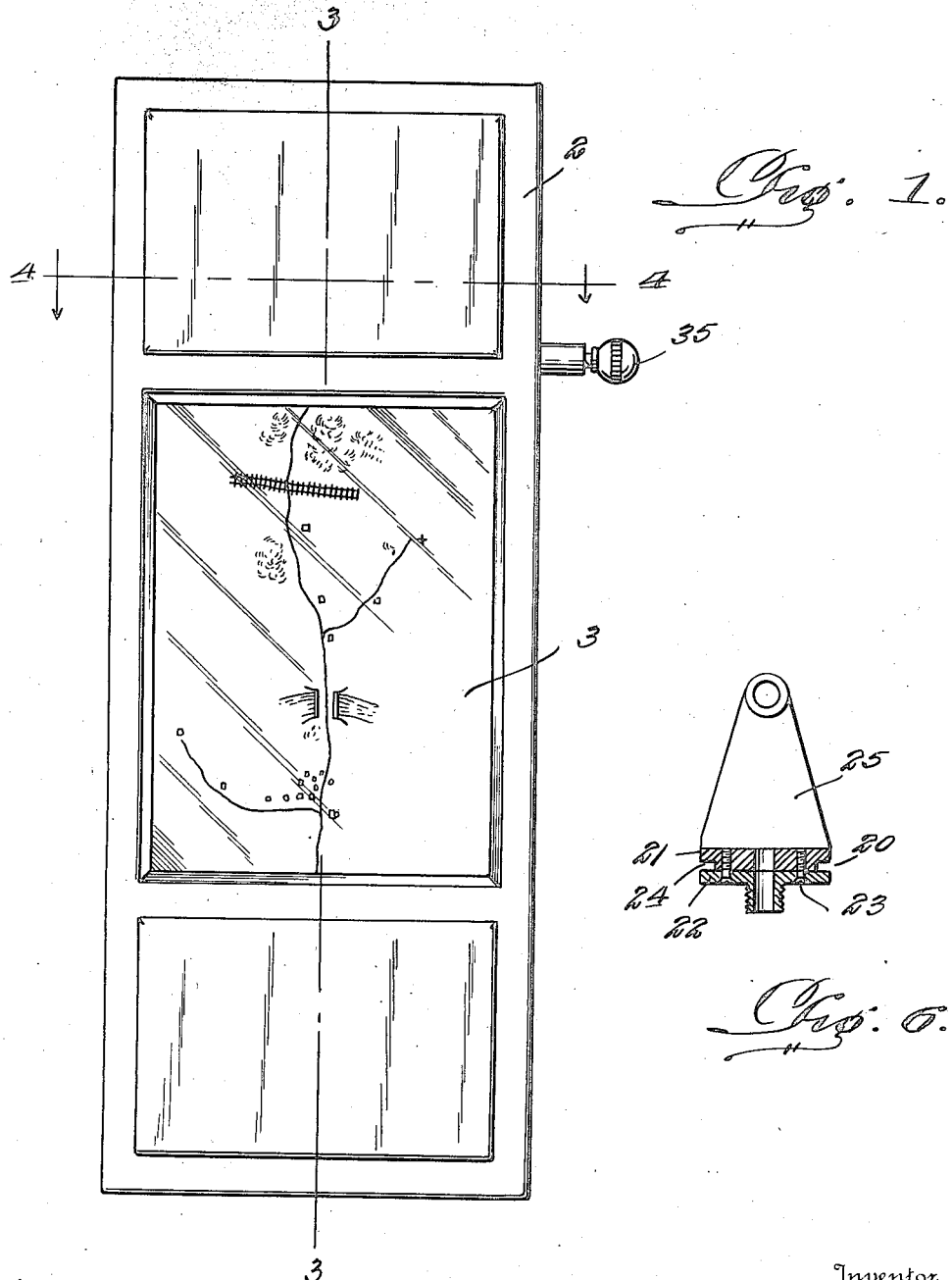
Figure 1 is a top plan view of an apparatus constructed in accordance with my present invention.
Figure 2:
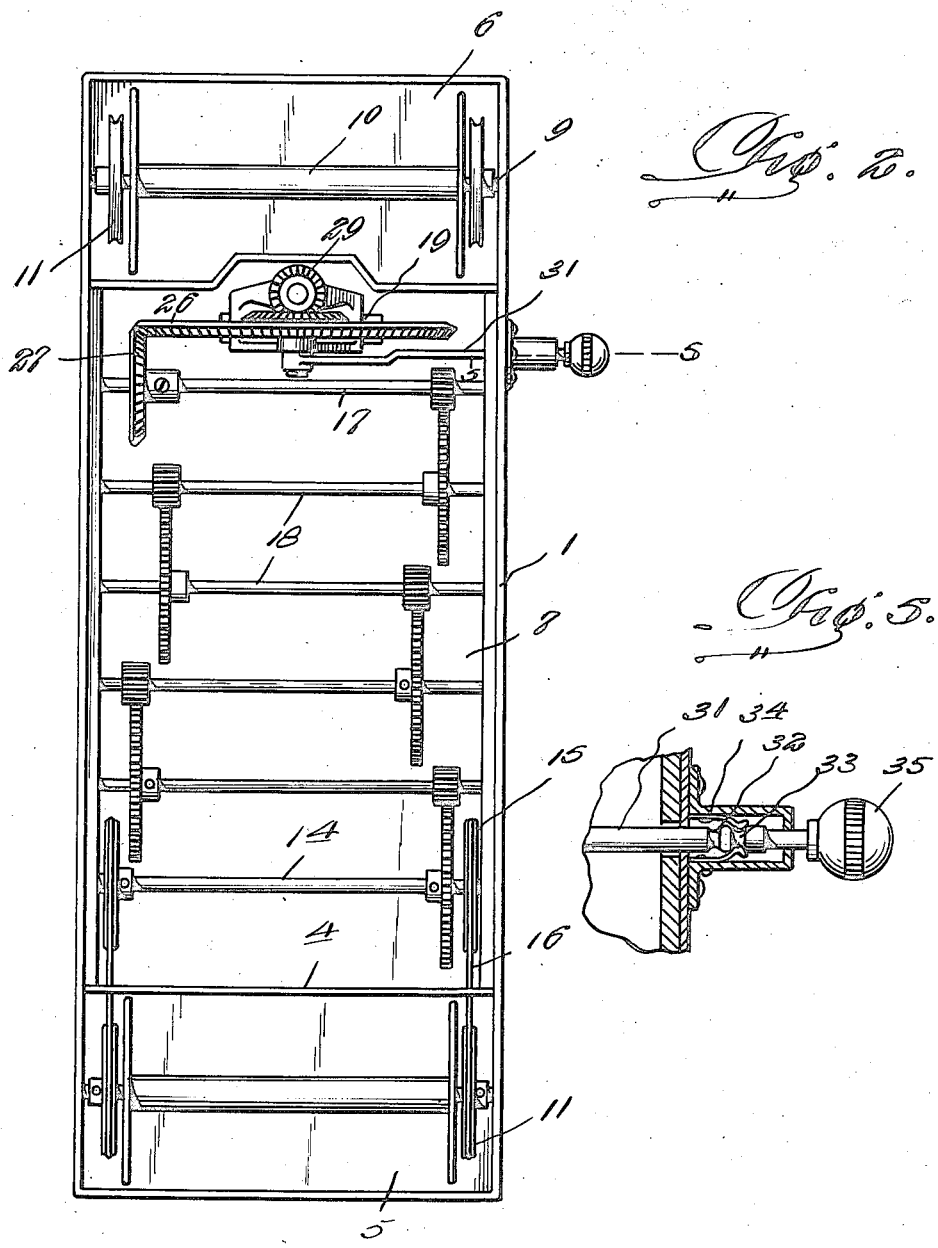
Figure 2 is a similar view, the top of the casing being removed.

Referring now to the drawings in detail, 1 designates a substantially rectangular casing embodying a bottom, side and end walls and having the top closed by means of a cover plate 2 which may be removed from the casing so as to expose the contents thereof. This cover plate 2 at a point between its ends is equipped with a transparent panel or window 3 formed of glass or any other transparent material and across which the map is moved. Arranged across the casing 1 adjacent to the respective ends thereof are partitions 4 that serve to divide the casing into end compartments 5 and 6 and a central compartment 7. Extending from one partition to the other across the top of the central compartment is a guide 8 arranged in juxtaposition to the window 3 and over this guide 8 the map is designed to travel. In each compartment 5, 6 is journaled a shaft 9 and fixed upon the shaft 9 is a reel or drum 10. Also fixed upon each shaft 9 at opposite ends of the drum 10 are grooved pulleys 11.

Wrapped about the reel or drum 10 in the compartment 6 is a map 12, one end of which is fastened to the reel 10, while the other end is carried over the guide 8 behind the window or panel 3 and fixed to the reel 10 in the compartment 5, so that in the rotation of the shaft 9 carrying the reel in the compartment 5 the map may be caused to move across the window 3 and unwind from the drum in the compartment 6 and wind upon the drum or reel in the compartment 5. The surface of the map exposed in the window depicts the topography of the country through which the vehicle is passing and the map is designed to be moved in proportion to the distance covered by the vehicle. For example, the map may move one inch to each mile of the vehicle and in order to so move the map so that the occupants of the vehicle will be advised at all times of the topography of the country during the progress of the vehicle I employ the following mechanism: Arranged within the central chamber 7 is a frame 13 in which is journaled a shaft 14 arranged at one end of the frame and extending across the compartment 7. On the shaft 14 are fixed grooved pulleys 15 that correspond in position to the positions of the grooved pulleys 11 on the shafts 9. In the present instance endless belts 16 are trained over the pulleys 15 and the pulleys 11 in the end chamber 5, so that in the operation of the shaft 14 the reel in the chamber 5 will be rotated to wind up the map. Journaled in the other end of the frame 13 is a shaft 17 and interposed between the shafts 17 and 14 is a gear train 18 by which motion is imparted from the shaft 17 to the shaft 14.

Figures 3, 4:
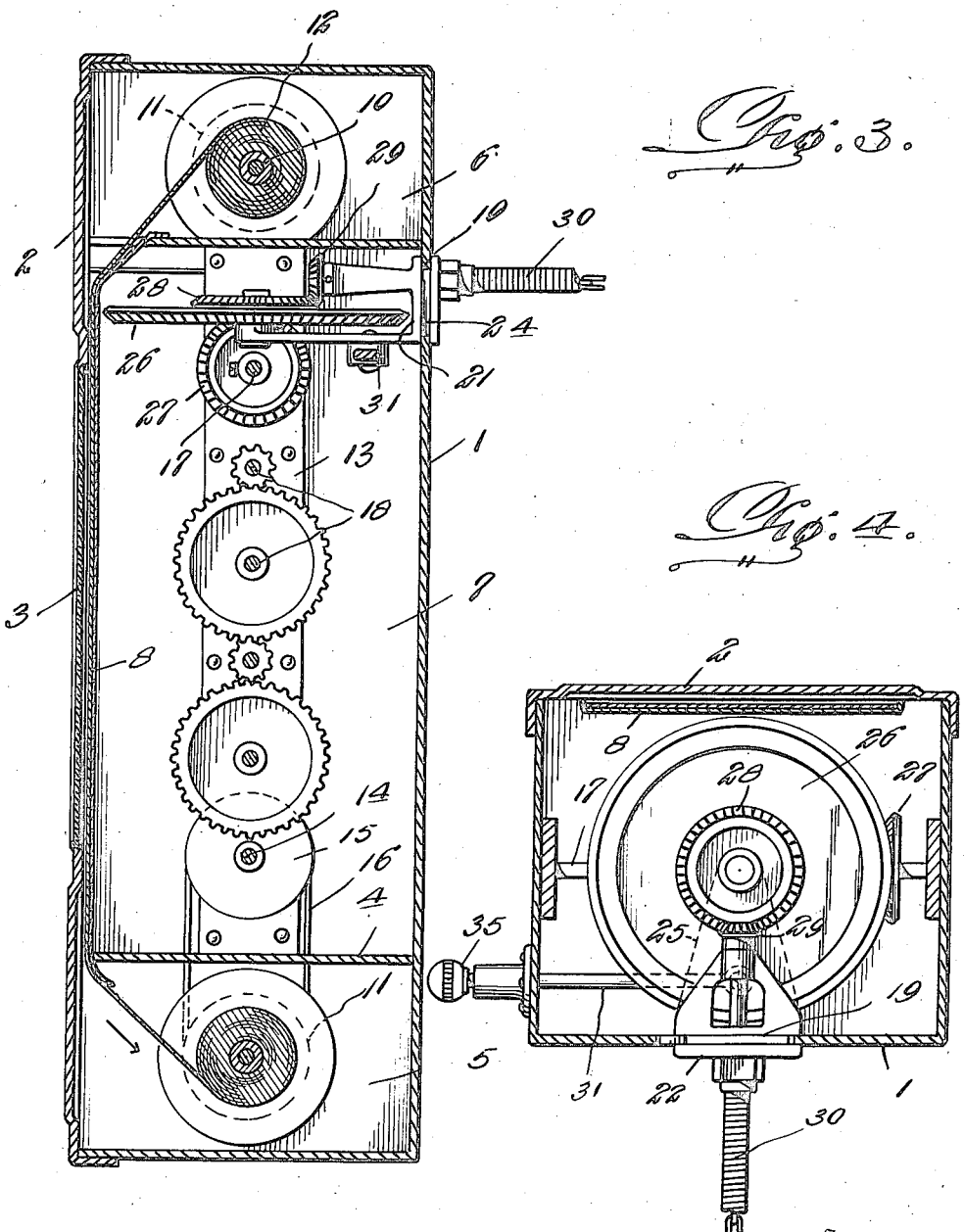
Figure 3 is a section on the line 3—3 of Figure 1.
Figure 4 is a sectional view on the line 4—4 of Figure 1.

In accordance with my invention the back wall or bottom wall of the casing 1 is formed with a cross slot 19 and mounted within the cross slot 19 and capable of sliding movement therein is a carriage 20 formed of plates 21 and 22 connected together by bolts or screws 23 and having the side edges formed with grooves 24 that engage opposite walls of the cross slot 19, so that the carriage 20 may be moved within the slot 10, the grooves 24 serving to hold the carriage securely in the slot. Suitably fixed to the inner plate 21 and extending into the central chamber 7 adjacent to the partition 4 of the compartment 6 is a bracket 25 in which is mounted a stud shaft that carries a beveled gear 26 that meshes with a beveled pinion 27 fixed upon the shaft 17. Arranged concentrically of the axis of the beveled gear 26 and secured thereto is a beveled pinion 28 that meshes with a similar pinion 29 fixed to one end of a flexible shaft 30 that extends through the carriage 20 and a portion of the bracket 25, as clearly shown in Figure 3 of the drawing. The other end of the flexible shaft 30 is connected with one of the ground wheels or the drive shaft of the motor vehicle, so that motion may be imparted from the vehicle as it travels along to the beveled gear 26. This motion of the vehicle is in turn transmitted to the shaft 14 through the medium of the pinion 27, shaft 17 and gear train 18 and the gear train 18 is in the nature of a reduction gear, by which the winding reel of the map is rotated in proportion to the travel of the vehicle, as previously described.

In order to render the operating mechanism of the map inactive the lower end of the stud shaft carrying the beveled gear 26 is connected to one end of a rod 31 that extends through one side wall of the casing 1. The portion of the arm 31 outside of the casing is formed with grooves 32 and 33, respectively, that may be interchangeably engaged by spring fingers 34. When the rod 31 is at its limit of inward movement the gear 26 meshes with pinion 27 and the fingers 34 engage in the groove 33, thereby holding the rod against accidental movement. To uncouple the beveled gear 26 from the pinion 27 and thereby render the operating mechanism inactive the rod 31 is pulled outwardly and the fingers 34 engage in the groove 32, thereby holding the rod in proper position. In the inward or outward movement of the rod a corresponding motion is imparted to the carriage 20, so that the pinions 29 and 28 and the beveled gear 26 move as a unit with the carriage, as does also the flexible driving shaft 30, as is readily apparent. The outer end of the rod 31 is provided with a suitable hand hold 35, as clearly illustrated in Figure 5 of the drawings.

From the foregoing description, taken in connection with the accompanying drawings, it will be seen that I have provided a map for motor vehicle tourists whereby the occupants of the vehicle may be at all times advised as to the topography of the country through which they are travelling and wherein the operating mechanism of the map may be rendered active and inactive at will. To reverse the direction of rotation of the map the endless belts 16 are removed from the pulleys of the reel in the chamber 5 and connected with the pulleys of the reel in the chamber 6, thereby reversing the operation of the map so that the occupants of the vehicle may be advised on the return trip.

It will be understood, of course, that if found necessary or desirable, suitable compensating mechanism may be employed in connection with each reel or drum, so that as the drums wind up the map and unwind the map and thereby increase and decrease in diameters, respectively, this change of diameters may be taken care of in order to prevent mutilating of the map and the binding thereof.

I have entered into a detailed description of the construction and relative arrangement of parts embraced in the present and preferred embodiments of my invention with a view to imparting a full, clear and exact understanding of the said embodiments. I do not desire, however, to be understood as confining myself to the said specific construction and relative arrangement of parts, inasmuch as in the future practice of my invention such changes or modifications may be made as fairly fall within the scope of my invention as defined by my appended claim.

Having thus described the invention, what is claimed as new, is:—

In apparatus of the class described, a casing divided into a central compartment and end compartments, a cover for said casing provided with a window over said central compartment, reels in said end compartments, respectively, a map wound about one of said reels and adapted to be unwound therefrom onto the other reel and movable across said window, a shaft in said central compartment, driving connections between said shaft and the winding reel, a train of reducing gears in said central compartment connected to said shaft whereby said shaft may be rotated to move said map a certain distance in proportion to the travel of the vehicle, a second shaft connected to said reduction gearing to operate the latter, a pinion on said last named shaft, a gear meshing with said pinion between said gear and a moving part of the vehicle, said driving connections including a flexible shaft, connections between said flexible shaft and gear and a bracket supporting said gear and last named connections and said flexible shaft and transversely movable within a slot in said casing and means for moving said bracket within said slot to engage said gear with said pinion and disengage the gear from the pinion.

In testimony whereof I affix my signature.

HARRY E. WILDER.